US010910644B2

(12) United States Patent
Nakamura et al.

(10) Patent No.: US 10,910,644 B2
(45) Date of Patent: Feb. 2, 2021

(54) POWER STORAGE DEVICE

(71) Applicant: KABUSHIKI KAISHA TOYOTA JIDOSHOKKI, Kariya (JP)

(72) Inventors: Tomohiro Nakamura, Kariya (JP); Takayuki Hirose, Kariya (JP); Kojiro Tamaru, Kariya (JP); Yuki Sugimoto, Kariya (JP); Hirokuni Akiyama, Kariya (JP); Motoyoshi Okumura, Nagoya (JP); Takuro Kikuchi, Nagoya (JP); Hidenori Takahashi, Okazaki (JP); Nobuyasu Haga, Seto (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/486,087

(22) PCT Filed: Jan. 24, 2018

(86) PCT No.: PCT/JP2018/002138
§ 371 (c)(1),
(2) Date: Aug. 14, 2019

(87) PCT Pub. No.: WO2018/150829
PCT Pub. Date: Aug. 23, 2018

(65) Prior Publication Data
US 2020/0058935 A1 Feb. 20, 2020

(30) Foreign Application Priority Data
Feb. 15, 2017 (JP) .................. 2017-026044
Jun. 28, 2017 (JP) .................. 2017-126614

(51) Int. Cl.
*H01M 4/02* (2006.01)
*H01M 4/52* (2010.01)
*H01M 4/66* (2006.01)

(52) U.S. Cl.
CPC ............ *H01M 4/52* (2013.01); *H01M 4/661* (2013.01); *H01M 4/668* (2013.01)

(58) Field of Classification Search
CPC ....................................................... H01M 4/02
See application file for complete search history.

(56) References Cited

U.S. PATENT DOCUMENTS

2004/0191631 A1 9/2004 Fukui et al.
2015/0086882 A1* 3/2015 Tsukada ............... H01M 2/024
429/405

FOREIGN PATENT DOCUMENTS

JP 62229772 A 10/1987
JP 2004296386 A 10/2004
(Continued)

OTHER PUBLICATIONS

International Preliminary Report on Patentability from the International Bureau in Application No. PCT/JP2018/002138 dated Aug. 15, 2019.

*Primary Examiner* — Jacob B Marks
(74) *Attorney, Agent, or Firm* — Sughrue Mion, PLLC

(57) ABSTRACT

A nickel-hydrogen battery includes a plurality of electrodes each including a current collector made of a metal, and disposed in a manner stacked in a first direction; a separator disposed between adjacent electrodes of the plurality of electrodes; a plurality of resin members disposed on peripheral portions of the plurality of electrodes to ensure a clearance between the adjacent electrodes; and a surface treatment layer covering one surface of the current collector at least in the peripheral portion of the plurality of electrode. The surface treatment layer includes a plurality of protrusions from the one surface. Widest parts of the protrusions are located above base ends thereof, and parts of the resin (Continued)

members are interposed between adjacent protrusions, across a range from tip ends to the base ends thereof.

11 Claims, 5 Drawing Sheets

(56) References Cited

FOREIGN PATENT DOCUMENTS

| | | |
|---|---|---|
| JP | 2006012589 A | 1/2006 |
| JP | 2007036026 A | 2/2007 |
| JP | 2014056799 A | 3/2014 |

* cited by examiner

POWER STORAGE DEVICE

CROSS REFERENCE TO RELATED APPLICATIONS

This application is a National Stage of International Application No. PCT/JP2018/002138 filed Jan. 24, 2018 claiming priority based on Japanese Patent Application Nos. 2017-026044 filed Feb. 15, 2017, and 2017-126614 filed Jun. 28, 2017.

TECHNICAL FIELD

One aspect of the present invention relates to a power storage device.

BACKGROUND ART

Patent Literature 1 discloses a bipolar secondary battery. This bipolar secondary battery includes: bipolar electrodes each having a positive electrode provided to one side of a current collector made of a metal, and a negative electrode provided to the other side; a separator interposed between the positive electrode and the negative electrode; and a frame-like sealing material surrounding a single cell including the positive electrode, the negative electrode, and the separator, the frame-like sealing material being pressure-bonded between the current collectors. In this bipolar secondary battery, the sealing material is made of a resin, and the sealing material has a high-pressure bonded part surrounding the single cell.

CITATION LIST

Patent Literature

Patent Literature 1: Japanese Unexamined Patent Publication No. 2014-56799

SUMMARY OF INVENTION

Technical Problem

In the conventional technique described above, a high-pressure bonded part is provided to the sealing material to suppress leakage of the electrolyte from between the current collector made of a metal and the sealing material made of a resin. As indicated by this example, in this technical field, it is necessary to ensure the strength and the liquid tightness between a current collector made of a metal and a resin member.

Therefore, an object of one aspect of the present invention is to provide a power storage device capable of ensuring the strength and the liquid tightness between a current collector made of a metal and a resin member.

Solution to Problem

A power storage device according to one aspect of the present invention includes: a plurality of electrodes each including a current collector made of a metal, and disposed in a manner stacked in a first direction; a separator disposed between adjacent electrodes; a plurality of resin members disposed on peripheral portions of the electrodes to ensure a clearance between the adjacent electrodes; and a surface treatment layer covering a surface of the current collector at least in the peripheral portions of the electrode, wherein the surface treatment layer includes a plurality of protrusions positioned along a second direction intersecting with the first direction, and protruding in the first direction from the surface, the protrusions each have a part becoming thicker from a base end toward a tip end thereof, and a part of the resin member is interposed between adjacent protrusions, across a range from the tip ends to the base ends thereof.

In this power storage device, a part of the resin member is interposed between the adjacent protrusions across the range from the tip ends and the base ends thereof. The protrusions each have a portion becoming thicker from the base end toward the tip end. This configuration restricts the movement of the part of the resin member interposed between the adjacent protrusions in a direction away from the base end. In this manner, because it is possible to reduce the chances of the resin member peeling off from the surface treatment layer, the strength and liquid tightness between the current collector made of a metal and the resin member can be ensured.

In the power storage device according to one aspect of the present invention, the surface treatment layer may also cover the surface of the current collector in the central portion of the electrode. In such a case, because the surface of the current collector is covered by the surface treatment layer in the central portion of the electrode, for example, when an active material serving as a positive electrode layer or a negative electrode layer is provided at the central portion of the current collector, adhesion between the surface of the current collector and the active material is improved.

In the power storage device according to one aspect of the present invention, the current collector may be an electrolytic foil, and the surface treatment layer may be an electroplating layer. In such a case, because the current collector is an electrolytic foil, very small bumps are formed at least on one surface of the current collector. Furthermore, because the surface treatment layer is an electroplating layer, a current concentration takes place on these bumps. By taking advantage of this current concentration on the bumps, the protrusions are allowed to grow on the surface treatment layer selectively on the bumps as their base ends.

In the power storage device according to one aspect of the present invention, the surface treatment layer may cover the surface of the current collector on one side of the first direction. In such a case, because the resin member comes to be disposed on one side of the surface of the current collector in the first direction, short-circuiting between the electrodes can be avoided reliably.

In the power storage device according to one aspect of the present invention, the electrode may also include a positive electrode layer provided to one surface of the current collector, and a negative electrode layer provided to the other surface of the current collector. In such a case, for example, the strength and the liquid tightness between the peripheral portion of the bipolar electrode and the resin member can be ensured.

Advantageous Effects of Invention

According to one aspect of the present invention, it is possible to provide a power storage device capable of ensuring the strength and the liquid tightness between the current collector made of a metal and the resin member.

DESCRIPTION OF EMBODIMENTS

An embodiment of a power storage device according to one aspect of the present invention will now be explained in detail with reference to some drawings. For the convenience of explanation, an XYZ Cartesian coordinate system is indicated in FIGS. 1 and 2.

Figure 1:
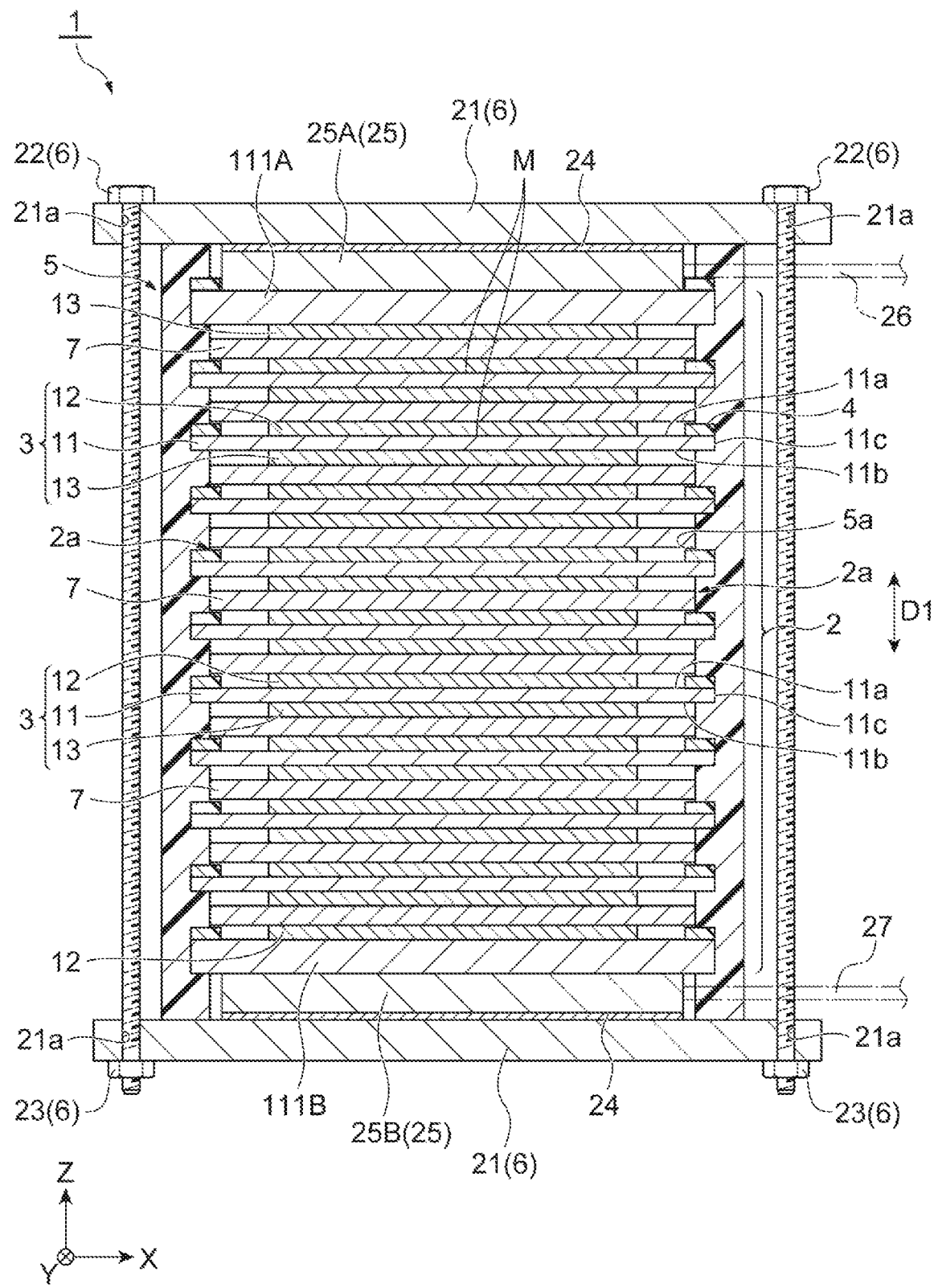
FIG. 1 is a sectional view schematically illustrating a power storage device according to one embodiment.

FIG. 1 is a sectional view schematically illustrating a power storage device according to one embodiment. This power storage device 1 is, for example, a secondary battery such as a nickel-hydrogen secondary battery or a lithium ion secondary battery, or an electric double-layer capacitor. The power storage device 1 is used as a battery for various types of vehicles such as a forklift, a hybrid car, or an electric car. Explained below is an example in which the power storage device 1 is a nickel-hydrogen secondary battery.

The power storage device 1 is a bipolar battery including a stack 2 of bipolar electrodes (electrodes) 3. The power storage device 1 includes the stack 2 of the bipolar electrodes 3, a casing 5 for holding the stack 2, and a binding body 6 for binding the stack 2.

The stack 2 is fabricated by stacking a plurality of bipolar electrodes 3 in a first direction D1, with separators 7 interposed between the adjacent bipolar electrodes 3. The first direction D1 herein is a direction extending along the Z-axis direction. Each of the bipolar electrodes 3 includes a current collector 11, a positive electrode layer 12 provided to one surface (surface) 11a of the current collector 11, and a negative electrode layer 13 provided to the other surface 11b of the current collector 11. The positive electrode layer 12 and the negative electrode layer 13 are provided at least to a central portion M of the current collector 11. In the stack 2, the positive electrode layer 12 of one bipolar electrode 3 faces the negative electrode layer 13 of one of the bipolar electrodes 3 adjacent thereto in the first direction D1, and the negative electrode layer 13 of the one bipolar electrode 3 faces the positive electrode layer 12 of the other bipolar electrode adjacent thereto in the first direction D1. The stack 2 includes a plurality of spacers (resin members) 4. The spacer 4 is provided along the peripheral portion 11c of the bipolar electrode 3 to ensure the clearance between the adjacent bipolar electrodes 3.

The current collector 11 is, for example, a metal foil made of nickel. The thickness of the current collector 11 is, for example, 0.1 micrometer to 1000 micrometers or so. Examples of the positive-electrode active material making up the positive electrode layer 12 include nickel hydroxide. Examples of the negative-electrode active material making up the negative electrode layer 13 include hydrogen storage alloy. The area in which the negative electrode layer 13 is formed on the other surface 11b of the current collector 11 may be somewhat larger than the area in which the positive electrode layer 12 is formed on the one surface 11a of the current collector 11.

The peripheral portion 11e of the current collector 11 is a non-coated area to where the coating of the positive-electrode active material and the negative-electrode active material is not applied. The peripheral portion 11c is held by the casing 5 in a manner buried in an inner wall 5a of the casing 5. The spacer 4 is interposed between the one surface 11a of the peripheral portion 11c and the inner wall 5a. In this manner, between the current collectors 11, 11 that are adjacent in the first direction D1, a space defined by the current collector 11, 11 and the inner wall 5a of the casing 5 is formed. Electrolyte (not illustrated) that is an alkaline solution, such as potassium hydroxide solution, is contained in this space. The spaces in which the electrolyte is contained in between the bipolar electrodes 3, 3 are liquid-tightly separated (sealed) from one another by the spacers 4.

A current collector 111A provided only with the negative electrode layer 13 on one side thereof is stacked on one stack end of the stack 2 (in the positive direction in the Z-axis direction). The current collector 111A is disposed in such a manner that the negative electrode layer 13 thereof faces the positive electrode layer 12 of the bipolar electrode 3 in the topmost layer, with the separator 7 interposed therebetween. A current collector 111B provided only with the positive electrode layer 12 is stacked on the other stack end of the stack 2 (in the negative direction of the Z-axis direction). The current collector 111B is disposed in such a manner that the positive electrode layer 12 thereof faces the negative electrode layer 13 of the bipolar electrode 3 in the bottom-most layer, with the separator 7 interposed therebetween. The ends of the current collectors 111A, 111B are held by the casing 5 in a manner buried in the inner wall 5a of the casing 5, in the same manner as the current collector 11 of the bipolar electrode 3. The spacer 4 is interposed between one surface of the end of the current collector 111A, 111B and the inner wall 5a. The current collectors 111A, 111B may be configured thicker than the current collector 11 included in the bipolar electrode 3.

The separator 7 has, for example, a sheet-like shape. Examples of the material from which the separator is made include a porous film made of a polyolefin resin such as polyethylene (PE) or polypropylene (PP), and a woven or non-woven fabric made of polypropylene. The separator 7 may be reinforced with, for example, vinylidene fluoride resin compound. The shape of the separator 7 is not limited to a sheet-like shape, but may also be a bag-like shape.

The casing 5 is provided with, for example, a rectangular tube-like shape formed by injection-molding an insulating resin. Examples of the resin material of which the casing 5 is made include polypropylene (PP), polyphenylene sulfide (PPS), modified polyphenylene ether (modified PPE), and modified polyphenylene sulfide (modified PPS). The casing 5 is a member surrounding and holding a side surface 2a of the stack 2 that is a stack of the bipolar electrodes 3.

The binding body 6 includes a pair of binding plates 21, 21, and coupling members (bolts 22 and nuts 23) that couple the binding plates 21, 21 together. The binding plate 21 has a flat plate-like shape made of a metal such as iron. Insertion holes 21a for inserting the bolts 22 are provided to the ends of the binding plate 21, at positions on the outer side of the casing 5. The inner circumferential surface of the insertion hole 21a and the bearing surface of the bolt, which are included in the binding body 6, are insulated. A terminal member 25 (a terminal member 25A, a terminal member 25B) is bonded to one surface of the binding plate 21 with an insulation member 24 interposed therebetween. Examples of the material of the insulation member 24 interposed between the binding plate 21 and the terminal member 25 includes fluororesin and polyethylene resin, for example.

One of the binding plates 21 is held abutting against one end surface of the casing 5 in such a manner that the terminal member 25A and the current collector 111A are brought into abutment against each other inside of the casing 5, and the other binding plate 21 is held abutting against the other end surface of the casing 5 in such a manner that the terminal member 25B and the current collector 111B are brought into abutment against each other inside of the casing 5. The bolt 22 is passed through the insertion hole 21a from the side of one binding plate 21 toward the other binding plate 21, and the nut 23 is screwed onto the tip end of the bolt 22 protruding outside from the other binding plate 21.

In this manner, the stack 2, the current collectors 111A, 111B, and the casing 5 are held between the binding plates 21 and assembled into one unit, and a binding load is applied thereto. Furthermore, each of the terminal member 25A and the terminal member 25B is positioned between corresponding one of the binding plates 21 and the stack 2 in such a manner that the stack 2 is interposed between the terminal member 25A and the terminal member 25B in the first direction D1. A lead 26 is connected to the terminal member 25A, and a lead 27 is connected to the terminal member 25B. The power storage device 1 can be charged and discharged through the lead 26 and the lead 27.

A part where the current collector 11, 111A, 111B and the spacer 4 are adjoined to each other in the power storage device 1 will now be explained in further detail. In the explanation hereunder, the current collector 11 will be described, but the current collectors 111A, 111B are also configured in the same manner.

Figure 2A:
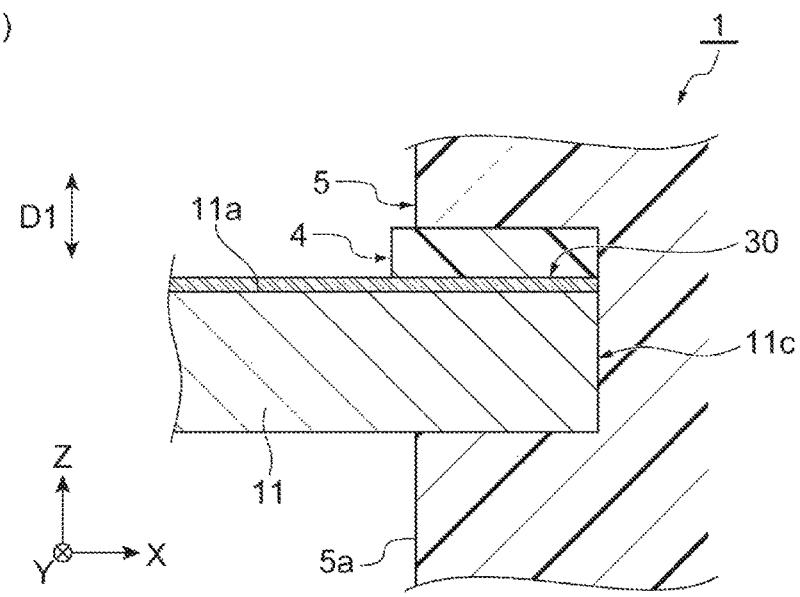
FIG. 2(a) is an enlarged sectional view of a peripheral portion of an electrode.

As illustrated in FIG. 2(a), a surface treatment layer 30 covering the one surface 11a of the current collector 11 is provided in the peripheral portion 11c of the current collector 11. The peripheral portion 11c of the current collector 11 is bonded to the spacer 4 with the surface treatment layer 30 interposed therebetween. The surface treatment layer 30 is provided to ensure the strength and the liquid tightness between the current collector 11 made of a metal and the spacer 4 that is a resin member. When the current collector 11 is an electrolytic foil, the surface treatment layer 30 may be formed by electroplating the current collector 11. The thickness of the surface treatment layer 30 is not limited to any particular size, but the thickness of the surface treatment layer 30 may be set to 0.1 micrometer to 30 micrometers, while the thickness of the current collector 11 is 0.1 micrometer to 1000 micrometers.

Figure 2B:
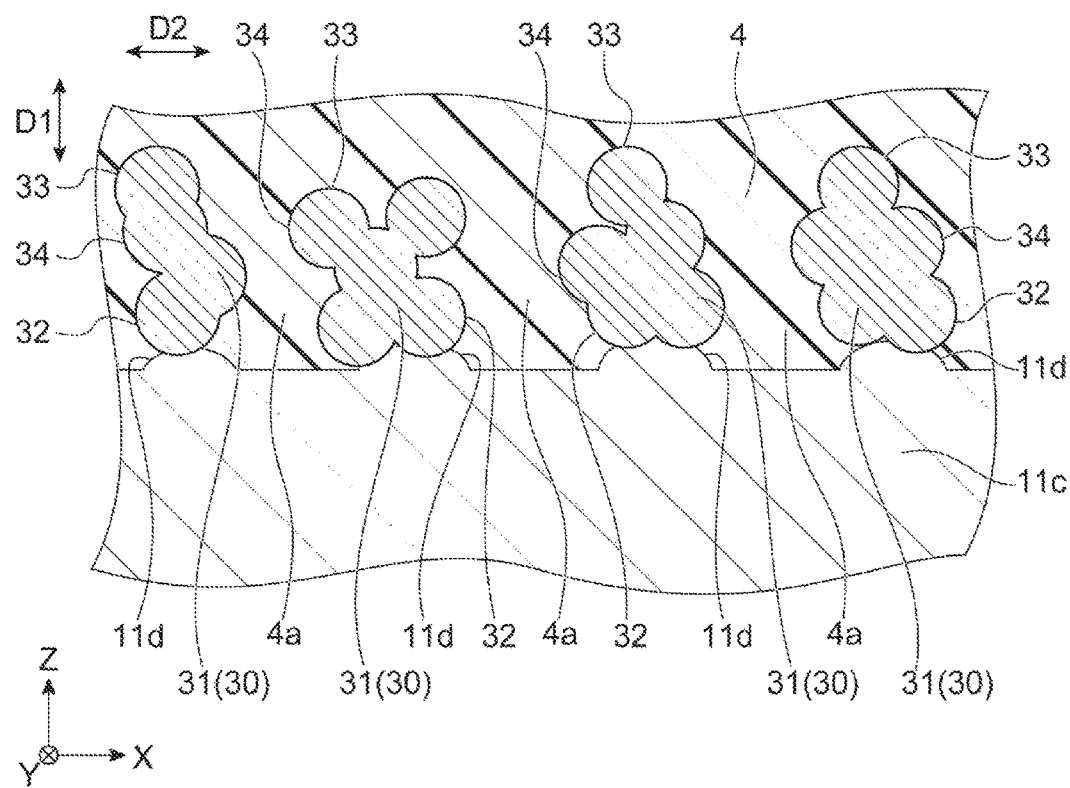
FIG. 2(b) is an enlarged sectional view of a surface of a current collector and a surface treatment layer.

As illustrated in FIG. 2(b), a plurality of protrusions 31 protruding in the first direction D1 are provided to the one surface 11a of the surface treatment layer 30. Each of the protrusions 31 is built upon a bump 11d (which will be described later) of the current collector 11 as a base end 32, and extends up to a tip end 33 in the first direction D1. These protrusions 31 are positioned along a second direction D2 intersecting with the first direction D1. The second direction D2 herein is a direction extending along the XY plane.

Each of the protrusions 31 includes a plurality of substantially spherical metal deposits (applied material) formed by electroplating. The protrusion 31 has an enlarged portion 34 where the length of the protrusion 31 in the second direction D2 is longer than that of the protrusion 31 in the base end 32 in the second direction D2, as the metal deposits build upon top of one another. In other words, the protrusion 31 has a part that becomes thicker from the base end 32 toward the tip end 33. The position of the enlarged portion 34 of the protrusion 31 do not necessarily need to be at the tip end 33, but the enlarged portion 34 is positioned at least on the side of the tip end 33 with respect to the base end 32.

The position of the enlarged portion 34 in the protrusion 31 may be different among the protrusions 31 depending on how the metal deposits build upon top of one another.

A part 4a of the spacer 4 is interposed between the adjacent protrusions 31. Specifically, the spacer 4 that is a resin member is formed in such a manner that a part 4a of the spacer 4 is interposed between the protrusions 31. In this manner, the adjacent protrusions 31 restrict the movement of such a part 4a of the spacer 4 positioned therebetween in a direction away from the base end 32. In other words, the cross-sectional shape between the adjacent protrusions 31 has an undercut shape that achieves the anchoring effect.

The surface treatment layer 30 covering the one surface 11a of the current collector 11 is formed in the central portion M (see FIG. 1) of the bipolar electrode 3. The central portion M of the current collector 11 is bonded to the positive-electrode active material of the positive electrode layer 12, with the surface treatment layer 30 interposed therebetween. In the example herein, the surface treatment layer 30 is formed continuously from the peripheral portion 11c to the central portion M on the one surface 11a of the current collector 11, as one example.

In each one of the current collectors 11, the surface treatment layer 30 covers the one surface (the surface in the positive direction in the Z-axis direction) in the first direction D1. In each of the current collectors 11, the spacer 4 is disposed on the one surface 11a of the current collector 11 with the surface treatment layer 30 interposed therebetween. With this configuration, in the adjacent bipolar electrodes 3, the spacer 4 on the one surface 11a of the current collector 11 faces the other surface 11b of the current collector 11 in the first direction D1. In other words, in the adjacent bipolar electrodes 3, the one surface 11a of the current collector 11 is not brought into direct contact with the other surface 11b of the current collector 11, but insulated by the spacer 4 that is a resin member.

A method for forming the protrusions 31 in the surface treatment layer 30 will now be explained.

Figure 3:
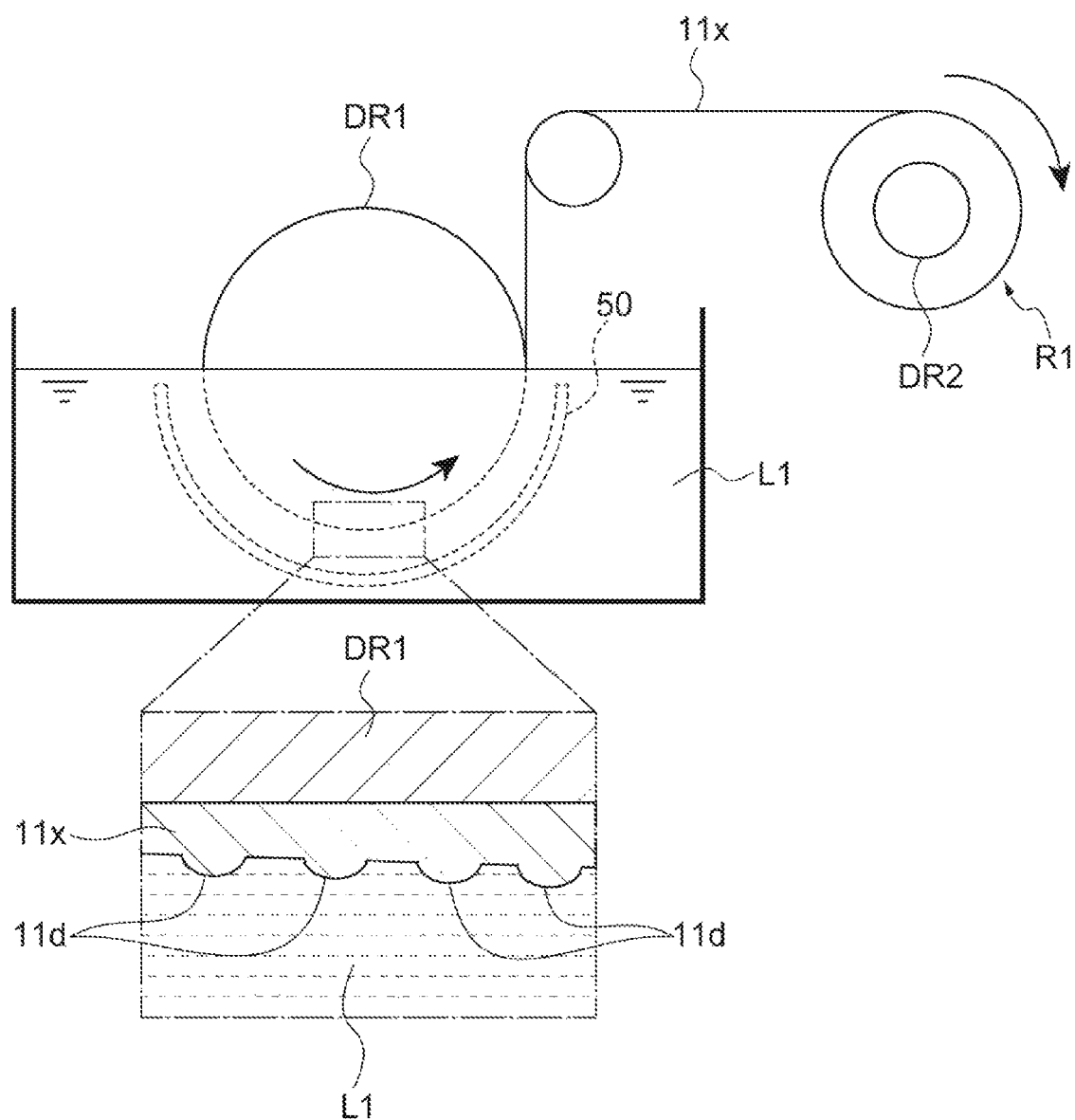
FIG. 3 is a schematic illustrating an exemplary process for manufacturing an electrolytic foil.

To begin with, as illustrated in FIG. 3, an electrolytic foil 11x with which the current collector 11 is made is fabricated. In the example illustrated in FIG. 3, a part of a drum DR1 and an anode 50 are soaked in electrolyte L1 including nickel cations. A predetermined current is then applied between the drum DR1 and the anode 50. As a result, nickel deposits on the surface drum DR1.

The electrolytic foil 11x is acquired by causing the nickel to deposit on the surface of the drum DR1 until the deposit has a certain thickness. As the nickel deposits on the surface of the drum DR1, very small bumps 11d are formed on the surface of the electrolytic foil 11x, the surface facing the opposite side of the drum DR1. The fabricated electrolytic foil 11x is then wound around a drum DR2 into a roll R1.

Figure 4:
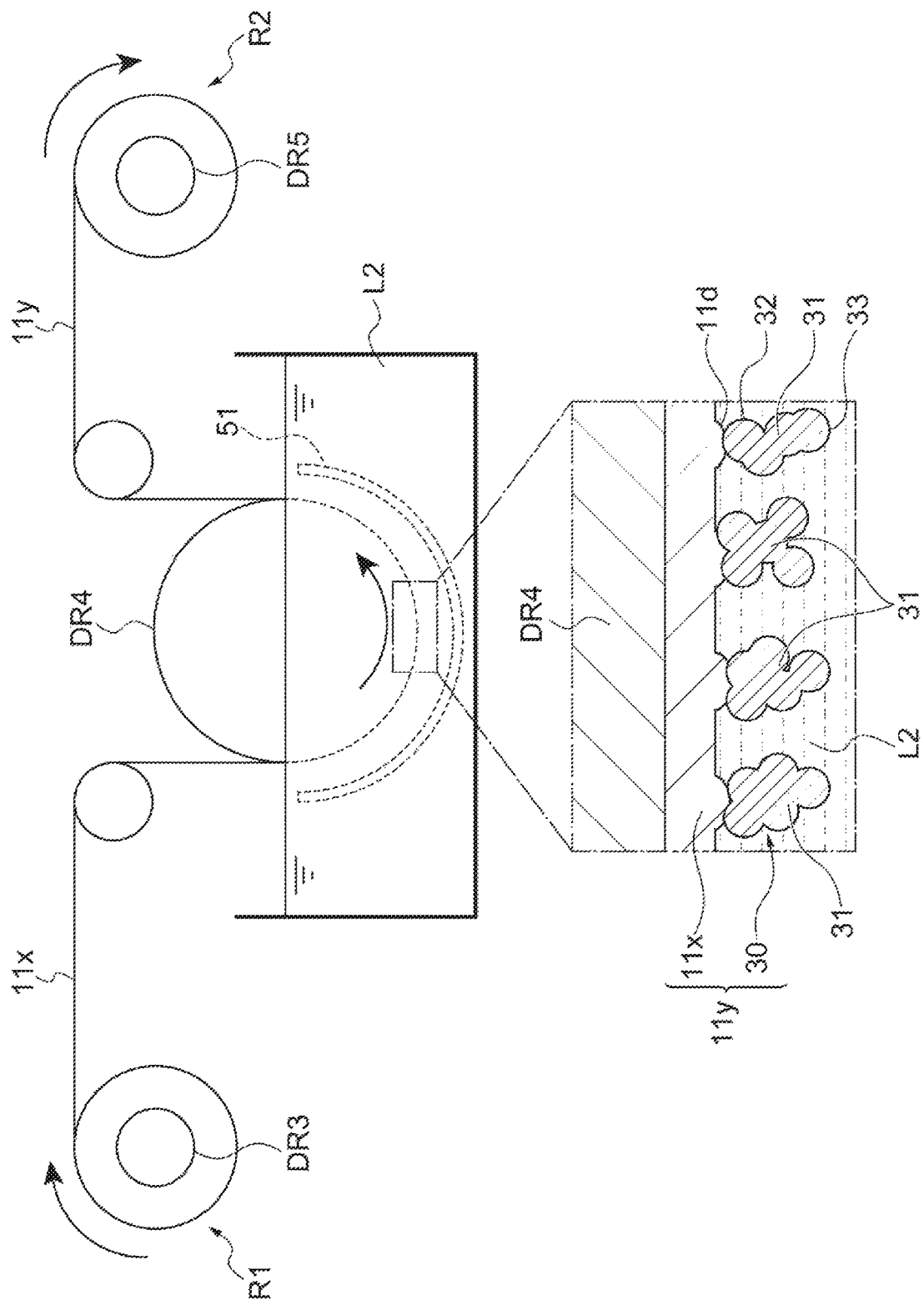
FIG. 4 is a schematic illustrating an exemplary process for manufacturing an electroplating layer.

An electroplating layer 30x making up the surface treatment layer 30 is then created, as illustrated in FIG. 4. In the example illustrated in FIG. 4, the electrolytic foil 11x pulled out of the roll R1 by a drum DR3 is conveyed along the surface of a drum DR4. A part of the drum DR4 and an anode 51 are soaked in electrolyte L2 including nickel cations. A predetermined current is then applied between the drum DR4 and the anode 51. As a result, nickel deposits on the surface of the electrolytic foil 11x on the drum DR4.

The electroplating layer 30x is a roughened plating layer acquired by causing the nickel to deposit on surface of the electrolytic foil 11x on the drum DR4 until the deposit has a certain thickness. As the nickel deposits on the surface of the electrolytic foil 11x on the drum DR4, nickel deposits on the bumps 11d formed on the electrolytic foil 11x. Specifically, a current concentration takes place on these bumps 11d, and the nickel deposits selectively on these bumps 11d as their base ends 32. In this manner, protrusions 31 grow on the electroplating layer 30x, and the surface treatment layer 30 is formed thereby. The electrolytic foil 11x and the electroplating layer 30x are conveyed as a roughened plating foil 11y, and wound around a drum DR5 into a roll R2.

Actions and effects achieved by the power storage device 1 according to the embodiment will now be explained.

In this power storage device 1, a part 4a of the spacer 4 is interposed between the adjacent protrusions 31, across the range from the tip end 33 to the base end 32 of the protrusion 31. The protrusion 31 has a part that becomes thicker from the base end 32 toward the tip end 33. This configuration restricts the movement of the part 4a of the spacer 4 positioned between the adjacent protrusions 31 in a direction away from the base end 32. Therefore, because it is possible to reduce the chances of the spacer 4 peeling off from the surface treatment layer 30, the strength and the liquid tightness can be ensured between the current collectors 11, 111A, 111B made of a metal and the spacer 4.

In this power storage device 1, the surface treatment layer 30 also covers the surface of the current collector 11 in the central portion M of the bipolar electrode 3. With this configuration, because the one surface 11a of the current collector 11 is covered by the surface treatment layer 30 in the central portion M of the bipolar electrode 3, the adhesion between the bipolar electrode 3 and the active material provided in the central portion M of the current collector 11 and serving as the positive electrode layer 12 or the negative electrode layer 13 is improved.

In this power storage device 1, the current collector 11 is provided as the electrolytic foil 11x, and the surface treatment layer 30 is provided as the electroplating layer 30x. Because the current collector 11 is provided as the electrolytic foil 11x, very small bumps 11d are formed on at least one surface of the current collector 11. Furthermore, because the surface treatment layer 30 is provided as the electroplating layer 30x, a current concentration takes place on these bumps 11d. With this configuration, taking advantage of the current concentrations at the bumps 11d, the protrusions 31 are allowed to grow on the surface treatment layer 30 selectively on the bumps 11d as their base ends 32.

In this power storage device 1, the surface treatment layer 30 covers the one surface of the current collector 11, 111A, 111B in the first direction D1 (the surface on the positive direction in the Z-axis direction). With this configuration, because the spacer 4 comes to be positioned on the one surface 11a of the current collector 11 on one side of the first direction D1, short-circuiting between the bipolar electrodes 3 can be avoided reliably.

In this power storage device 1, the bipolar electrode 3 includes the positive electrode layer 12 provided to one surface 11a of the current collector 11, and the negative electrode layer 13 provided to the other surface 11b of the current collector 11. With this configuration, the strength and the liquid tightness can be ensured between the peripheral portion 11c of the bipolar electrode 3 and the spacer 4.

The one aspect of the present invention is not limited to the embodiment described above.

Figure 5:
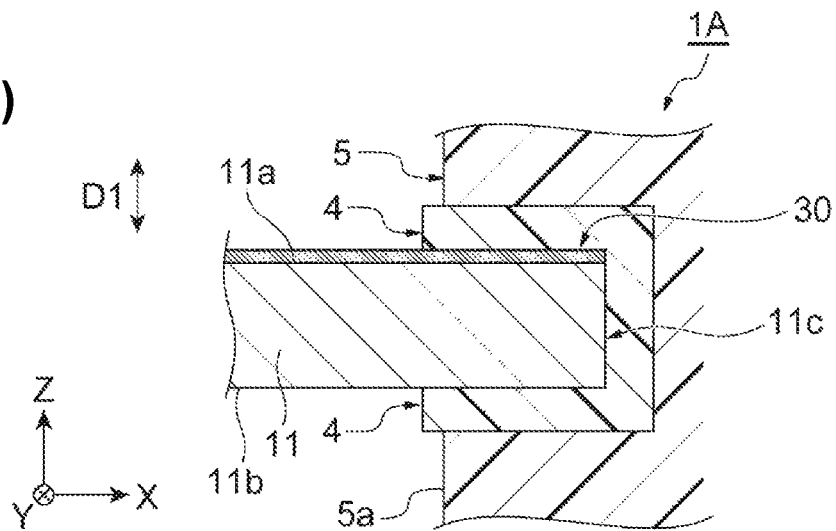
FIGS. 5(a) to 5(c) are enlarged sectional views of peripheral portions of electrodes according to some modifications.
Figure 5:
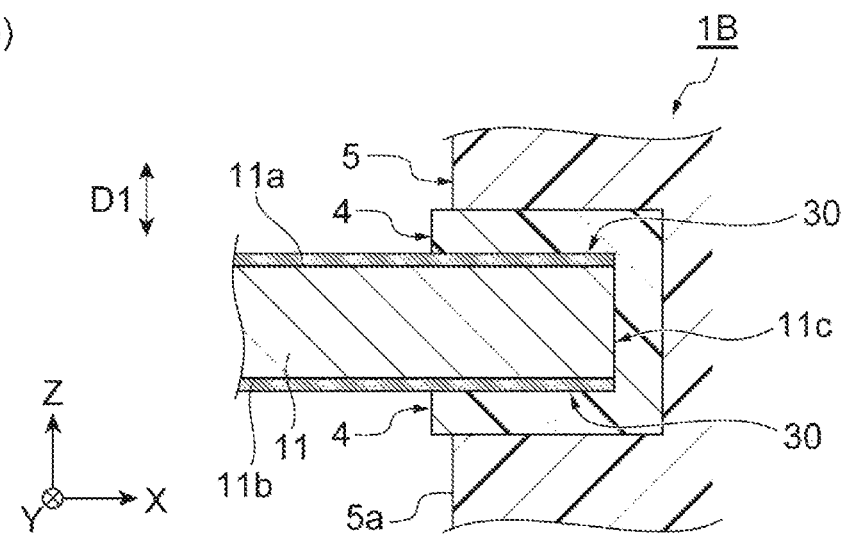
Figure 5:
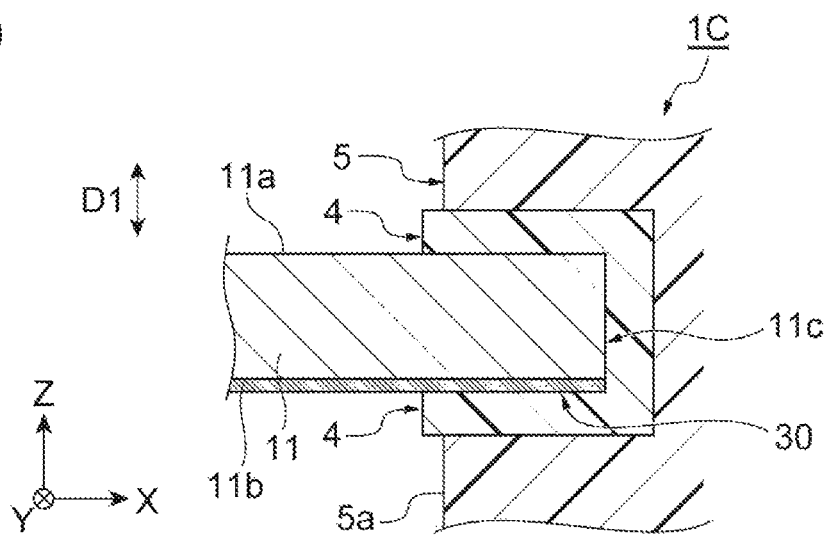

Explained in the embodiment described above is an example in which the surface treatment layer 30 covering the one surface 11a of the current collector 11 is provided to the peripheral portion 11c of the current collector 11, and the spacer 4 is disposed on the one surface 11a of the peripheral portion 11c of the current collector 11, with the surface treatment layer 30 interposed therebetween, as illustrated in FIG. 2(a). The one aspect of the present invention is not limited thereto. For example, as illustrated in FIG. 5(a), the spacer 4 may be disposed on both surfaces 11a, 11b of the current collector 11. In other words, a possible configuration includes a power storage device 1A in which the one surface 11a of the peripheral portion 11c of the current collector 11 is bonded to the spacer 4 with the surface treatment layer 30 interposed therebetween, and the other surface 11a of the peripheral portion 11c of the current collector 11 is covered by the spacer 4.

Furthermore, as illustrated in FIG. 5(a), when the spacer 4 is disposed on both surfaces 11a, 11b of the current collector 11, it is possible to suppress deformation or warpage of the current collector 11, the positive electrode layer 12, or the negative electrode layer 13, due to an expansion or shrinkage difference between the spacer 4 and the current collector 11 resulting from change in the temperature (resulting from heating and cooling in the process of fabricating the power storage device 1A, heat of reaction in the bipolar electrode 3, and change in the outside temperature), moisture absorption, or aging.

Explained in the embodiment described above is an example in which the surface treatment layer 30 is provided to the one surface (surface) 11a of the current collector 11, as illustrated in FIG. 2(a), but the surface treatment layer 30 may be provided to both of the one surface 11a and the other surface 11b. Furthermore, in such a case as well, the spacer 4 may be disposed on both surfaces 11a, 11b of the current collector 11, as illustrated in FIG. 5(b). In other words, a possible configuration includes a power storage device 1B in which both surfaces 11a, 11b of the peripheral portion 11c of the current collector 11 are bonded to the spacer 4, with the surface treatment layers 30 interposed therebetween.

In the example explained in the embodiment described above, the surface treatment layer 30 is provided to one surface (surface) 11a of the current collector 11, as illustrated in FIG. 2(a), but the surface treatment layer 30 may be provided only to the other surface 11b, without being provided to the one surface 11a. Furthermore, in such a configuration as well, the spacer 4 may be disposed on both surfaces 11a, 11b of the current collector 11, as illustrated in FIG. 5(c). In other words, a possible configuration includes a power storage device 1C in which the one surface 11a of the peripheral portion 11c of the current collector 11 is covered by the spacer 4, and the other surface 11b of the peripheral portion 11c of the current collector 11 is bonded to the spacer 4 with the surface treatment layer 30 interposed therebetween.

In the embodiment described above, the current collector 11 is a metal foil made of nickel, but may also be an aluminum foil or copper foil. The current collector 11 may also be a rolled sheet or a rolled foil.

In the embodiment described above, each of the protrusions 31 in the surface treatment layer 30 is formed with a plurality of substantially spherical metal deposits formed by electroplating, but the protrusions 31 in the surface treatment layer 30 may also be formed by applying a plurality of metal particles on the surface of the current collector 11 by sputtering or other processing. Furthermore, the shape of the protrusion 31 is not limited to a particular shape, as long as at least a part of the shape has a shape becoming thicker from the base end 32 toward the tip end 33.

REFERENCE SIGNS LIST 1, 1A, 1B, 1C . . . power storage device, 3 . . . bipolar electrode (electrode), 4 . . . spacer (resin member), 4a . . .

part, 7 . . . separator, 11, 111A, 111B . . . current collector, 11a . . . one surface (surface), 11b . . . the other surface (surface), 11c . . . peripheral portion, 11x . . . electrolytic foil, 12 . . . positive electrode layer, 13 . . . negative electrode layer, 30 . . . surface treatment layer, 30x . . . electroplating layer, 31 . . . protrusion, 32 . . . base end, 33 . . . tip end, 34 . . . enlarged portion.

The invention claimed is:

1. A nickel-hydrogen battery comprising:
a plurality of electrodes each including a current collector made of a metal, and disposed in a manner stacked in a first direction;
a separator disposed between adjacent electrodes of the plurality of electrodes;
a plurality of resin members disposed on peripheral portions of the plurality of electrodes to ensure a clearance between the adjacent electrodes; and
a surface treatment layer covering a surface of the current collector at least in the peripheral portions of the plurality of electrodes, wherein
the surface treatment layer includes a plurality of protrusions protruding from the surface in the first direction,
widest parts of the protrusions are located above base ends thereof, and
parts of the resin members are interposed between adjacent protrusions of the plurality of protrusions, across a range from tip ends to the base ends thereof.

2. The nickel-hydrogen battery according to claim 1, wherein the surface treatment layer also covers the surface of the current collector in a central portion of the electrode.

3. The nickel-hydrogen battery according to claim 1, wherein
the current collector is an electrolytic foil, and
the surface treatment layer is an electroplating layer.

4. The nickel-hydrogen battery according to claim 1, wherein the surface treatment layer covers the surface of the current collector on one side of the first direction.

5. The nickel-hydrogen battery according to claim 1, wherein the electrode further includes a positive electrode layer provided to one surface of the current collector, and a negative electrode layer provided to another surface of the current collector.

6. The nickel-hydrogen battery according to claim 1, wherein the protrusions are nickel.

7. A nickel-hydrogen battery comprising:
a plurality of electrodes each including a current collector made of a metal, and disposed in a manner stacked in a first direction;
a separator disposed between adjacent electrodes of the plurality of electrodes;
a plurality of resin members disposed on peripheral portions of the plurality of electrodes to ensure a clearance between the adjacent electrodes; and
a surface treatment layer covering a surface of the current collector at least in the peripheral portions of the plurality of electrodes, wherein
the surface treatment layer includes a plurality of protrusions protruding in the first direction from bumps as base ends formed on the surface of the current collector,
widest parts of the protrusions are located above the base ends thereof, and
parts of the resin members are interposed between adjacent protrusions of the plurality of protrusions, across a range from tip ends to the base ends thereof.

8. The nickel-hydrogen battery according to claim 7, wherein the protrusions are nickel.

9. A nickel-hydrogen battery comprising:
a plurality of electrodes each including a current collector made of a metal, and disposed in a manner stacked in a first direction;
a separator disposed between adjacent electrodes of the plurality of electrodes;
a plurality of resin members disposed on peripheral portions of the plurality of electrodes to ensure a clearance between the adjacent electrodes; and
a surface treatment layer covering a surface of the current collector at least in the peripheral portions of the plurality of electrodes, wherein
the surface treatment layer includes a plurality of protrusions protruding from the surface in the first direction,
widest parts of the protrusions are located above base ends thereof, and have a plurality of built-up metal deposit forms a plurality of protrusions and
parts of the resin members are interposed between adjacent protrusions of the plurality of protrusions, across a range from tip ends to the base ends thereof.

10. The nickel-hydrogen battery according to claim 9, wherein the metal deposits are substantially spherical.

11. The nickel-hydrogen battery according to claim 9, wherein the metal deposits are nickel.

* * * * *